(12) United States Patent
Kumeth

(10) Patent No.: US 7,143,891 B2
(45) Date of Patent: Dec. 5, 2006

(54) VIBRATING SPIRAL CONVEYOR

(75) Inventor: Sigmund Kumeth, Kastl (DE)

(73) Assignee: Feintool International Holding, Lyss (CH)

( * ) Notice: Subject to any disclaimer, the term of this patent is extended or adjusted under 35 U.S.C. 154(b) by 93 days.

(21) Appl. No.: 11/146,580

(22) Filed: Jun. 6, 2005

(65) Prior Publication Data

US 2006/0021856 A1     Feb. 2, 2006

(30) Foreign Application Priority Data

Jul. 15, 2004   (DE)  ...................... 10 2004 034 482

(51) Int. Cl.
*B65G 27/02*        (2006.01)
(52) U.S. Cl. ...................... 198/757; 198/756
(58) Field of Classification Search ............. 198/752.1, 198/757, 756, 767, 770, 771
See application file for complete search history.

(56) References Cited

U.S. PATENT DOCUMENTS 3,917,052 A * 11/1975 Burgess, Jr. ................. 198/757

| | | | | |
|---|---|---|---|---|
| 4,262,797 A | * | 4/1981 | Schuricht et al. ........... | 198/756 |
| 5,477,958 A | * | 12/1995 | Buhren et al. ............... | 198/751 |
| 6,161,679 A | * | 12/2000 | Graham ...................... | 198/763 |

FOREIGN PATENT DOCUMENTS

| | | |
|---|---|---|
| DE | 41 38 956 | 3/1993 |
| DE | 103 12 706 | 10/2004 |
| EP | 0 644 134 | 2/1992 |

* cited by examiner

*Primary Examiner*—James R. Bidwell
(74) *Attorney, Agent, or Firm*—Jordan and Hamburg LLP

(57) ABSTRACT

A vibrating spiral conveyor includes a vibrating system with a useful mass and a counter mass which can be brought into a mutually oppositely oscillating rotational vibrating movement about a central axis of rotation over at least one driving device. The useful mass and the counter mass are mounted so that they can be moved with respect to one another over spring arrangements, which are distributed about the axis of rotation, a portion of the useful mass being a pot, which is disposed detachably and exchangably. The moments of inertia ($M_N$, $M_G$) of the useful mass and of the counter mass are in a defined ratio to one another and the pot, which can be mounted exchangeably, is designed so that the moment of inertia ($M_N$) of the useful mass and, with that, the ratio of the moments of inertia ($M_N$, $M_G$) remain essentially unchanged.

11 Claims, 3 Drawing Sheets

VIBRATING SPIRAL CONVEYOR

BACKGROUND OF THE INVENTION

The invention relates to a vibrating spiral conveyor, consisting of vibrating system with a useful mass and a counter mass, which can be brought into a mutually oppositely oscillating rotational vibrating movement about a central axis of rotation over at least one driving device, the useful mass and the counter mass being mounted so that they can be moved with respect to one another over spring arrangements, which are distributed about the axis of rotation, a portion of the useful mass being a pot, which is disposed detachably and exchangably.

SUMMARY OF THE INVENTION

Such vibrating, spiral conveyors serve to convey components, which are brought into the pot as a disordered quantity, along a conveying spiral, which is formed predominantly at the inner wall of the pot, and, optionally after a prior orientation during the movement, to supply them to a processing step, for example, of a work station and a manufacturing device or installation device. A generic vibrating spiral conveyor is known, for example, from EP 0 644 134 B1. In order to produce the movement of the pot, which causes the movement of the components, a vibrating system is provided, which has two masses, namely a useful mass and a counter mass, which move in an oscillating manner in opposite directions to one another. The useful mass and the counter mass are moved in opposite directions to one another by means of a drive device, predominantly an electromagnetic drive device. Because of this mutually opposite movement of the masses, a transfer of the vibrations to a machine table or a machine frame, at which the spiral conveyor is provided, is largely compensated for.

In order to be able to use the vibrating spiral conveyor flexibly, it is known from EP 0 644 134 B1 that the pot may be exchanged. However, exchanging the pot, which is part of the useful mass, generally results in a change in the mass relationships and therefore in a change in the damping of the vibrations because of the masses moving equally in opposite directions. A change in the moment of inertia of the useful mass is also associated with exchanging the pot.

To counter this problem, a vibrating spiral conveyor or a vibrating spiral conveyor system with several pots is known from the EP 0 644 134 B1. For this system, the equalization of the masses or of the moment of inertia is accomplished over an auxiliary mass, which is to be affixed at the counter mass depending on the pot used or, optionally also additionally, by a change in or an adjustment of the spring characteristics or spring constant of the spring arrangements assigned to the useful mass, so that the inherent frequency of the useful mass is equal to the inherent frequency of the oppositely vibrating mass for the particular pot used. Accordingly, when a pot is changed, costly new adjustments are required for varying the spring properties by affixing or removing mass portions in the region of the counter mass all by affixing or removing individual leaf springs of the spring arrangements. Consequently, it is possible to change a pot only with much expenditure of time and labor and such an exchange can be carried out only by trained personnel.

It is therefore an object of the invention to indicate a vibrating spiral conveyor or a vibrating spiral conveyor system comprising additionally several exchange pots, for which a flexible exchange of pots is possible without additional adjustment or equalization measures.

Pursuant to the invention, this objective is accomplished by a vibrating spiral conveyor or a system comprising several prepared pots owing to the fact that the moments of inertia of the useful mass and the counter mass are in a defined relationship to one another and a pot, which can be affixed in exchange, is designed so that the moment of inertia of the useful mass and, with that, the relationship of the moments of inertia, remain essentially unchanged.

The invention is based on the realization that, contrary to what was assumed previously, the moment of inertia or the moment relationships of the useful mass to the counter mass play a central role for damped operation of the conveyor, free of interfering vibrations, whereas, in comparison, the identity of the masses plays a subordinate role. Consequently, for the inventive vibrating spiral conveyor, a specified ratio of the moments of inertia of the useful mass to the counter mass is provided and, aside from slight tolerances, also retained, that is, not changed when a pot is exchanged. For this purpose, each pot of the system, which can be coupled with the vibrating system, is designed with regard to its inherent moment of inertia, so that the total moment of inertia of all the useful masses essentially remains the same and so that also, resulting therefrom, the moment ratio continues to correspond to the specified ratio. This means that the inertial properties of the vibrating system as a whole remain unchanged in spite of the change in pots.

Pots can therefore also be exchanged by laymen, since each system-specific and usable pot is equalized from the very start with regard to its moment of inertia. The moment relationships at the vibrating system are standardized. For this reason, a standardized drive unit may be used. The exchange can be made quickly. Because of the constantly identical relationships, further adjustments or equalizations are not required. Consequently, the mounting of the masses as a whole over the arrangement of springs remains unaffected. This means that the spring arrangements or the like need not be changed.

Provided that the changes in the useful masses, which result from exchanging a pot, are kept within certain limits, it is not necessary to change or equalize the masses, since, as described, the ratio of the moments of inertia but not that of the masses is the central, determining parameter. In particular, the pots, which are provided for a vibrating spiral conveyor or a vibrating system, are designed in such a manner, that the masses differ only insignificantly. However, in order to arrive at even further optimization of the vibrating, as well as of the damping behavior, it is appropriate for the weights of the useful mass and also of the counter mass to be essentially the same and a pot, which is to be mounted in an exchange, is designed so that the weight of the useful mass remains essentially unchanged. This means that, during an exchange of pots, not only the dynamic moment of inertia of the useful mass, but also the weight of the useful mass remains approximately unchanged. This means that, when pots are exchanged, the relationships of the moments of inertia and of the masses change, if at all, only within a relatively narrow, specifiable tolerance range.

Preferably, the useful and counter masses are equal in magnitude and therefore form a ratio of 1:1 with one another. Correspondingly, the moments of inertia may also be of equal magnitude, so that here also there is a ratio of 1:1. It is, however, also conceivable to design the moment of inertia of the useful mass, which remains the same in spite of a change of pots, somewhat larger than that of the counter mass, in order to reach a range of the inherent frequency of the oscillating rotational vibration of the pot during the operation of the system, which is relatively close to the operating frequency of the operating voltage, in order to achieve a better and more rapid conveying over the pot drive by these means.

On the whole, the inventive vibrating spiral conveyor and the vibrating spiral conveyor system, comprising the several pots, equalized with regard to the moment of inertia and optionally the masses, offers the possibility of exchanging pots very rapidly and flexibly without cumbersome equalization activities, since the moments and masses are equalized automatically by the pot, which is equalized appropriately from the very start with regard to the specified moment and mass relationships.

The fact that no changes have to be made on the part of the drive unit containing the counter mass and a portion of the useful mass during the exchange of pots, makes it possible, pursuant to the invention, to use a standardized drive unit, comprising a base, an opposed-action past, which is coupled with the base over spring arrangements, as well as a fastening part, which is coupled with the base over spring arrangements and the motion of which is coupled with that of the pot, and the electromagnetic driving device, which acts between the opposed-action part and the fastening part and comprises several drive modules, of which a first driving part is disposed at the opposed-action part and a second driving part is disposed at the fastening part, the fastening part and the second driving part being part of the useful mass and the opposed action part and the first driving part essentially forming the counter mass.

A standardized drive unit is used, which is designed for the respective vibrating spiral conveyor type or the type-specific system, is prefabricated and adjusted at a plant and does not have to be changed anymore in operation even when there is an exchange of pots. As described, the drive unit comprises the whole counter mass, consisting of the opposed-action part, as well as of the first driving part, which form the essentially the counter mass. Of course, appropriate fastening means, such as screws, etc., which must necessarily be used, also form part of the counter mass. The useful mass is also, in part, contained in the standardized drive unit and, moreover, in the form of the fastening part, which may be in one or more parts, and serves to accommodate the pot or the motion of which is coupled with that of the pot and at which the second drive unit of a respective drive module is provided, as well as optionally required fastening means, such as screws, etc. In the case of electromagnetic drives, the two drives parts are constructed in the form of an electromagnet and a magnet armature. The whole of the drive unit may now be manufactured as a prefabricated standard component for the respective type or the type-specific system and, optionally, also be encapsulated, since it does not have to be adapted or equalized. The pots, which may be used, are designed for the properties of the standardized drive unit. In other words, a quasi modular system is indicated, with the standardized drive unit and the assigned pots, which may be used and which are designed, as required, for the objects that are to be conveyed. Drive units of different output may be provided, which cover different mass and moment ranges. The user therefore has the possibility of making a selection of a drive, which has been optimized for his purposes, from a larger range of such drives and, at the same time, has the possibility of handling a wide variation of components, which are to be processed with such a drive.

For optimum vibrating properties, it is appropriate if the respective moments of inertia and optionally also the weights of the useful mass and the counter mass are selected, taking into consideration the properties of the spring arrangements, that is, primarily the spring constants of the leaf springs, in such a manner that the resonance frequency of the oscillating rotational vibration is the same or greater than the operating frequency of the supply voltage, driving the preferably electromagnetic driving device. Preferably, the vibrating spiral conveyor is operated so that the resonance frequency or inherent frequency of the vibrating system, which is a function of the dynamic moment of inertia and therefore of the ratio of the moments of inertia of the two masses and the spring characteristics of the spring arrangements, is as close as possible to the frequency of the drive unit, especially of the network frequency of an electromagnetic drive arrangement operated with this frequency. In this connection, the inherent frequency preferably is greater than the operating frequency, which means that the vibrating system is operated sub-critically, so that the mass of the material conveyed does not have a disadvantageous effect on the vibrating behavior of the vibrating spiral conveyor.

A pot may be adapted or equalized especially with respect to the moment of inertia by its shape or geometry and, with that, the distribution of the mass related to the radius of the pot which, as a rule, is round in cross section. The mass of the pot may also be equalized by the thickness of the wall, the material, etc. It is, however, particularly appropriate if, for adjusting the moment of inertia and/or weight of the pot to the fixed moment of inertia and/or a weight of the useful mass, one or more equalizing weights are or may be mounted at the pot. A pot, which is to be used with a standardized engagement unit, can be adjusted relatively easily in this way. For this purpose, it is merely necessary to determine the pot-specific moment of inertia using a suitable measuring device and subsequently to mount the equalizing weight or weights at the pot in order to equalize the moment. In this way, there is no need to take into consideration very tight tolerances with regard to the manufacturing technique of the pots, since these can be equalized readily within the scope of the exact adjustment.

For this purpose, one or more mounts, at or in which the equalizing weight or weights is or can be mounted, are advisably provided at the outside of the pot. Fastening can be accomplished in defined positions. This means that several mounts, the position of which is defined and to which equalizing weights may, for example, be screwed, are provided at the peripherally, preferably in a common plane. A mount may be constructed, for example, as a borehole with an internal thread.

Alternatively, it is also conceivable to construct a mount as a peripheral groove, in which the equalizing weights may be mounted in any position, for example, by clamp fasteners, etc. It is, however, important that the equalizing weights are always divided symmetrically with respect to the central axis, that is, with a division of 180°, 120°, 90°, etc., depending on the number of equalizing weights that are to be disposed. In this connection, an equalizing weight advisably is constructed as an annular segment of defined shape and weight, adapted to the shape of the outside of the pot or of the groove. Moreover, using these equalizing weights, it is also conceivable not only to equalize a system-specific pot, but also to raise the pot with regard to the moment of inertia as well as the weight to a next higher system, which has a stronger drive unit, or to lower it with regard to a drive unit of weaker output. This is possible especially if the equalizing weights are held by a detachable connection, such as a screw connection or a clamping connection. Alternatively, however, a glued, welded or soldered connection for fastening the weight is also conceivable.

Aside from using additional weights, which are fastened at the pot, it is conceivable to adjust the moment of inertia and/or the weight of the pot for adaptation to the fixed moment of inertia and/or weight of the useful mass by removing material from or applying it on the pot. This means that the pot produced is first of all measured with regard to the actual moment and, subsequently, either material is removed, for example, by dressing or milling, if the pot is too heavy or the moment is too large. Conversely it is, for example, conceivable to increase the moment or weight, for example, by welding on additional weights.

Further advantages, distinguishing features and details of the invention arise out of the example, described in the following, as well as from the drawings.

DESCRIPTION OF THE PREFERRED EMBODIMENTS

Figure 1:
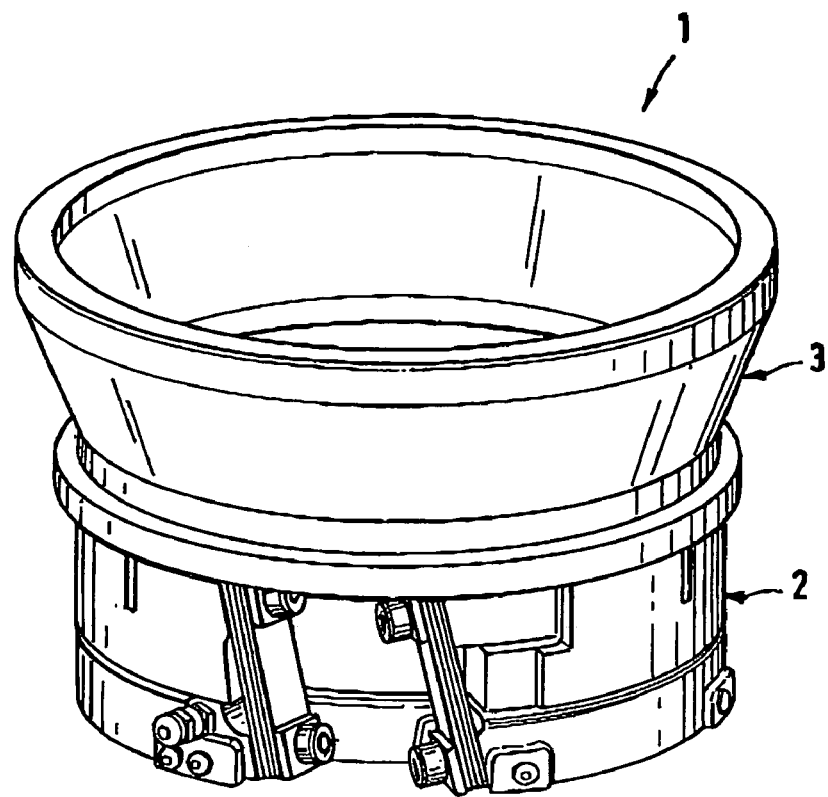
FIG. 1 shows an inventive vibrating spiral conveyor, on which the pot has been placed.
Figure 2:
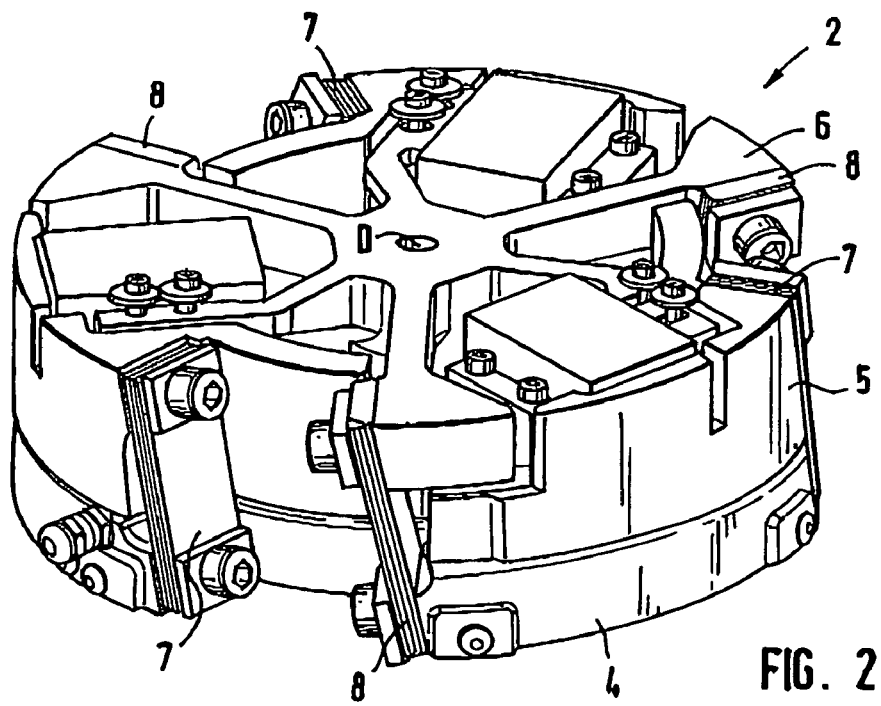
FIG. 2 shows a perspective representation of the drive unit of the conveyor of FIG.
Figure 3:
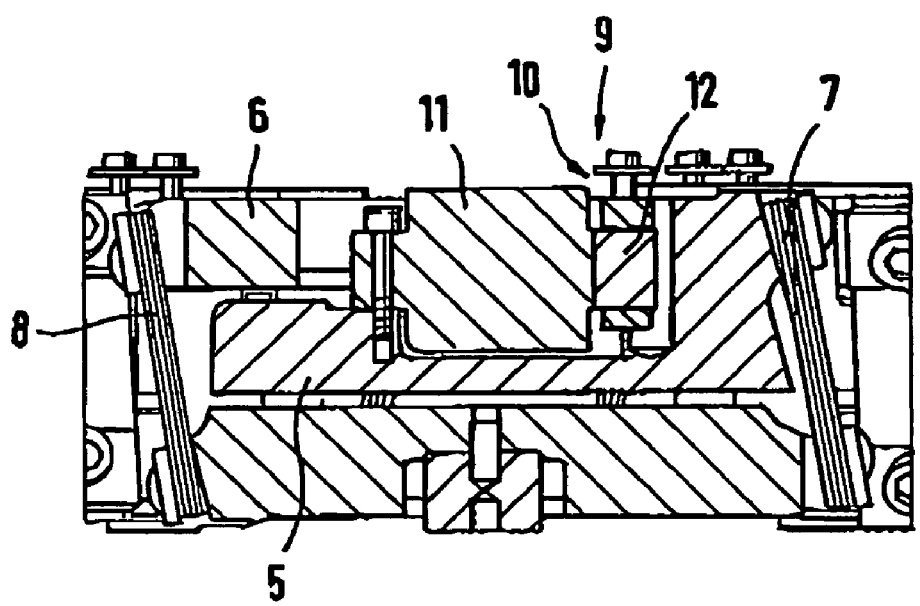
FIG. 3 shows a sectional representation through the drive unit of FIG. 2.
Figure 4:
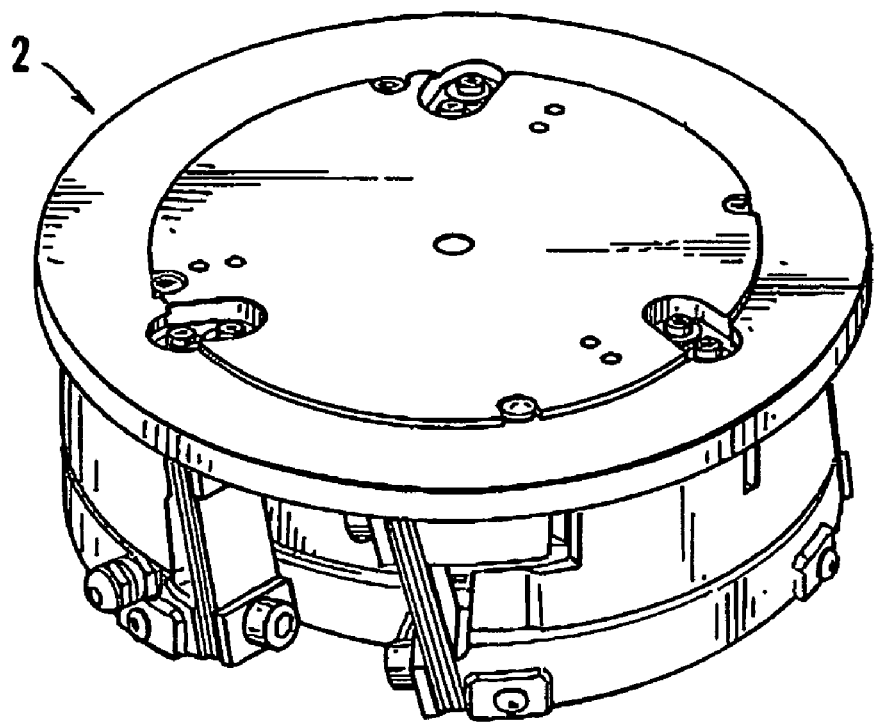
FIG. 4 shows the drive unit, which has not been sectioned.

FIG. 1 shows an inventive vibrating spiral conveyor 1, consisting of a standardized drive unit 2 and a pot 3, which is connected with the drive unit 2 using fastening elements. The pot 3 can be moved by the drive unit 2 for conveying small components in the pot, which are conveyed along a conveying spiral at the inner wall of the pot, the details of which are not shown, by micro-throws produced by the vibrations.

For this purpose, the drive unit 2 consists of a base part 4, on which on the one hand, an opposed-action part 5 and, on the other, a fastening part 6 are disposed over appropriate spring arrangements. The opposed action part 5 is connected over spring arrangements 7 in the form of leaf spring packages elastically with the base part 4. In the Example 3 shown, such spring arrangements are provided at angular distances of 120° with respect to the axis of rotation D, which, at the same time, represents the central axis. Correspondingly, the fastening part 6 is connected over spring arrangements 8, which here also are leaf spring packages, which are spaced apart from one another by 120°, with the base part 4. In the part shown, the fastening part 6 is constructed star-shaped and engages, as it were, the opposed action part 5 or is accommodated in the latter. During the operation of the conveyor, the opposed-action part 5 and the fastening part 6 vibrate equally opposite to one another about the axis of rotation D, that is, they carry out an oscillating, rotational vibrating movement. This is brought about over a drive unit 9, comprising several drive modules 10, which operate electromagnetically and comprise a magnetic core 11, which is fastened to the opposed-action part 5 and vibrates with the latter, as well as a magnet amateur 12, which is located opposite to the magnetic core 11 and is disposed at the fastening part 6, with which it vibrates. The drive device 9 is driven over a suitable supply voltage, especially a network voltage, so that a vibrating frequency, which depends on the mains frequency as well as on the mass relationships and inertia relationships, sets in, and with which the relevant masses vibrate with respect to one another.

These masses are a counter mass and a useful mass. In the example shown, the counter mass is formed essentially by the opposed-action part 5 as well as by the magnetic cores 11 located at the latter (in addition to the appropriate fastening means, such as screws, etc.). The useful mass is formed, in part, by the fastening part 6 (which is constructed at the top in the form of a plate and forms the supporting surface for the pot 3), as well as the three magnet anchors 12 and the corresponding fastening means.

The counter mass, as well as the useful mass have, in their totality, a certain weight, namely the counter mass weight $G_G$ and the useful mass weight $G_N$. Furthermore, each mass has a mass-specific moment of inertia, namely the counter-mass moment $M_G$ and the useful mass moment $M_N$. In order to exchange a part 3 without having to make an expensive equalization of the moment of inertia because of a change in moment by the new pot, so that a pot, which can be placed on the drive unit 2, is constructed or equalized already at the plant, so that the moment of inertia $M_N$ of the useful mass remains essentially unchanged when a pot, intended for the system, is set down, aside from slight tolerances in the range of a few percent around the specified value of the moment. The moment of inertia of the counter mass remains untouched and largely constant.

Preferably, the corresponding also applies for the mass weights. The total weight $G_N$ of the useful mass remains essentially unchanged when any of the pots, assigned to the system, are set down, aside here also from slight tolerances. The weight $G_G$ of the counter mass also remains unchanged.

Consequently, the relationship of the moment of inertia of the useful mass to the moment of inertia of the counter mass as well as the weight of the useful mass to the weight of the counter mass remain constant in spite of the change in pots. Therefore the following relationships apply:

$$M_N = M_{NA} + M_{NT} = const.$$

$$M_G = const.$$

$$M_N : M_G = const. \text{ with } M_N : M_G \geq 1$$

$$G_N = G_{NA} + G_{NT} = const.$$

$$G_G = const.$$

$$G_N : G_G = const. \text{ with } G_N : G_G = 1$$

For the above $M_N$=moment of inertia of the useful mass
$M_{NA}$=moment of inertia of the useful mass–drive unit
$M_{NT}$=moment of inertia of the useful mass–pot
$M_G$=moment of inertia of the counter mass
$G_N$=weight of the useful mass
$G_{NA}$=weight of the useful mass–drive unit
$G_{NT}$=weight of the useful mass–pot
$G_G$=weight of the counter mass As described, the respective masses are composed essentially of the components named. In this connection, the moment of inertia of the useful mass of the drive unit $M_{NA}$, as well as the weight of this useful mass part $G_{NA}$ remains constant, since no changes whatsoever are made in the area of the drive unit even when a pot is exchanged. This means that $M_{NA}$ and $G_{NA}$=const. Actually, with that, any pot, which can be used within the system, has the same moment of inertia $M_{NT}$ as well as the same pot weight $G_{NT}$.

As described, the drive unit 2 is a component, which is standardized at the plant. No further equalization or adjustments have to be made in operation. In view of the inventive design of the pot, this is also not necessary. In order to ensure an optimum vibrating operation, the resonance frequency of the oscillating, rotational, vibrating movement of the useful mass and of the counter mass should fall within the range of the operating frequency of the supply voltage. The moments of inertia of the useful mass and of the counter mass are designed and specified for this purpose, the spring properties of the spring arrangements 7, 8 being taken into consideration.

Figure 5:
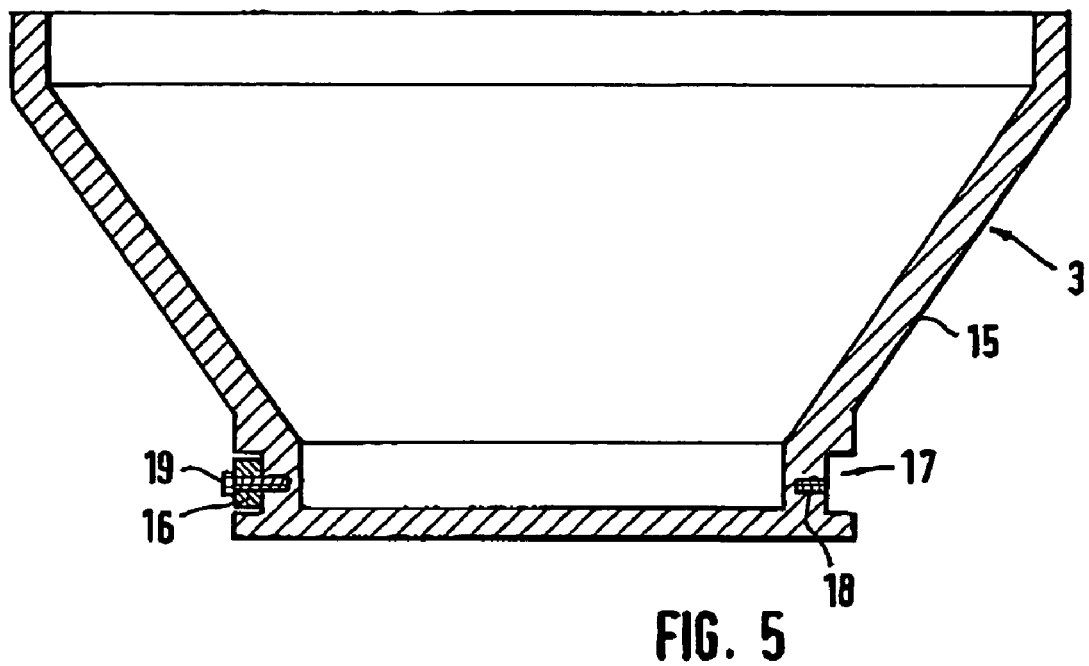
FIG. 5 shows a diagrammatic representation in section of an inventive pot to show how equalization weights are held.
Figure 6:
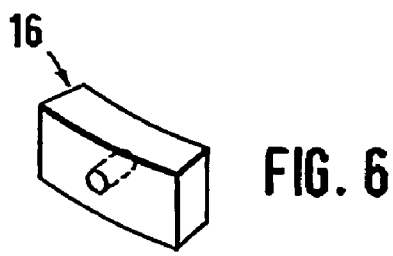
FIG. 6 shows a diagrammatic representation of an equalization weight, which is to be mounted.

As described, different pots can be fastened to the drive unit 2 for conveying different objects. The basic design of the pots does not differ significantly. However, the individual pots, with regard to the material conveyed, may have different moments of inertia as well as weights. For equalizing the moment of inertia and finally also for adapting the weight, it is possible to affix several equalizing weights 16 at the outside 15 of a pot 3. For this purpose, a groove 17 is provided, in which, in the example shown, several boreholes 18, which are provided with an internal thread and into which a screw 19, holding the equalizing weight 16, can be screwed, are provided. As shown in FIG. 5, there is an equalization weight 16 in the groove. It has a specified weight as well as a defined shape and size. On the basis of the specified, radial position as well as of the specified weight, shape and size, equalization with respect to the moment in relation to the required pot moment of inertia $M_{NT}$ as well as the required part weight $G_{NT}$ can be accomplished by using an appropriate number of weights. In the example shown, the equalization weight 16 is constructed as an annular segment. Several such annular segments can be closed into a ring.

Figure 7:
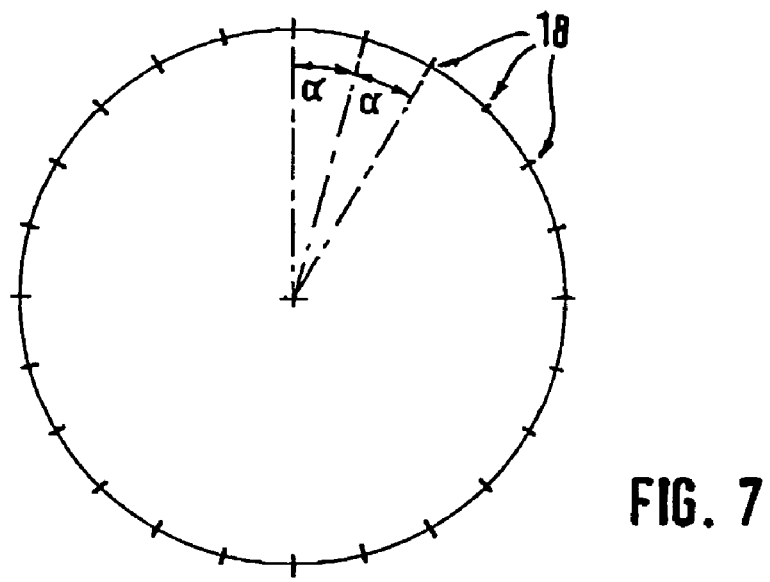
FIG. 7 shows a diagrammatic representation of the arrangements of mounts for holding the equalization weights at the outside of the pot.

In order to have a greater possibility of variation with regard to fastening the weight as well as with regard to the number of weights, which can be used, a division of the boreholes 18, for example, as shown in the diagrammatic drawing of FIG. 7, is conceivable. In the example shown, the boreholes are separated from one another by an angle α=15°.

Alternatively to the screw attachment, it is also possible to clamp or to glue the equalizing weights in the groove or to weld them there. In the final analysis, the particular attachment also depends on the material used for the pot. However, in addition to fastening an equalization weight to the outside of the pot, it is also conceivable to set the pot on an equalization disk. In the final analysis, the moment and, if necessary, also the mass can be equalized in any way, as long as it is ensured that the equalized pot has the required moment of inertia as well as, optionally, the required weight.

The invention claimed is:

1. A vibrating spiral conveyor comprising at least one driving device, a useful mass and a counter mass which can be brought into a mutually oppositely oscillating rotational vibrating movement about a central axis of rotation by said at least one driving device, the useful mass and the counter mass being mounted so that they can be moved with respect to one another over spring arrangements which are distributed about an axis of rotation, a portion of the useful mass being a pot which is disposed detachably and exchangeably, the moments of inertia ($M_N$, $M_G$) of the useful mass and of the counter mass being in a defined ratio to one another, the pot, which can be mounted exchangeably, being designed so that the moment of inertia ($M_N$) of the useful mass and, with that, the ratio of the moments of inertia ($M_N$, $M_G$) remain essentially unchanged.

2. The vibrating spiral conveyor of claim 1, wherein the moments of inertia ($M_N$, $M_G$) essentially are identical or that the moment of inertia ($M_N$) of the useful mass is larger than that of the counter mass.

3. The vibrating spiral conveyor of claim 1, wherein the weights ($G_N$, $G_G$) of the useful mass and of the counter mass are essentially identical and the pot, which can be mounted exchangeably, is designed so that the weight of the useful mass remains essentially unchanged.

4. The vibrating spiral conveyor of claim 1, comprising a standardized drive unit having a base part, an opposed-action part coupled with the base part over the spring arrangements, as well as a fastening part, which is coupled with the base part over the spring arrangements and the motion of which is coupled with that of the pot, and an electromagnetic driving device, which acts between the opposed-action part and the fastening part and comprises several drive modules, of which a first driving part is disposed at the opposed action part and a second driving part is disposed at the fastening part, the fastening part and the second driving part being part of the useful mass and the opposed action part and the first driving part essentially forming the counter mass.

5. The vibrating spiral conveyor of claim 1, wherein the respective moments of inertia ($M_N$, $M_G$) are selected, taking into consideration the properties of the spring arrangements, in such a manner that the resonance frequency of the oscillating, rotational vibrating movement is equal to or larger than the operating frequency of a supply voltage driving a electromagnetic driving device.

6. The vibrating spiral conveyor of claim 1, wherein one or more equalizing weights is or are or can be affixed at the pot for adjusting the moment of inertia ($M_{NT}$) and/or the weight ($G_{NT}$) of the pot in order to match the fixed moment of inertia ($M_{NT}$) and/or the weight of the useful mass.

7. The vibrating spiral conveyor of claim 6, wherein one or more seats, at or in which the equalizing weight or weights are or can be affixed, are provided at the outside of the pot.

8. The vibrating spiral conveyor of claim 7, wherein a seat is constructed as a peripheral groove.

9. The vibrating spiral conveyor of claim 7, wherein the equalization weight is constructed as an annular segment which is adapted to the shape of the outside of the pot.

10. The vibrating spiral conveyor of claim 6, wherein the equalization weights can be held by a screw and clamp connection, a glued connection or a welded or soldered connection.

11. The vibrating spiral conveyor of claim 1, wherein the adjustment of the moment or inertia ($M_{NT}$) and/or of the weight ($M_{GT}$) of the pot for adapting them to the moment of inertia ($M_N$) and/or the weight ($G_N$) of the useful mass is realized by removing material from or applying material to the pot.

* * * * *